United States Patent [19]

Hung

[11] Patent Number: 5,715,948
[45] Date of Patent: Feb. 10, 1998

US005715948A

[54] CD RACK

[76] Inventor: Chun-jen Hung, No. 4, Chungliu Rd., Erhlin Chen, Changhua Hsien, Taiwan

[21] Appl. No.: 786,173

[22] Filed: Jan. 21, 1997

[51] Int. Cl.$^6$ ................................................. A47F 7/00
[52] U.S. Cl. .................. 211/40; 211/194; 206/308.1; 206/504; 220/23.4; 403/205; 403/217; 312/9.47
[58] Field of Search ............... 211/40, 194; 206/308.1, 206/504; 220/23.4; 403/205, 403, 217, 219; 108/64, 91; 312/9.9, 9.47, 9.48, 9.53, 9.56; 446/102, 117, 120, 126

[56] References Cited

U.S. PATENT DOCUMENTS

| | | | |
|---|---|---|---|
| 4,536,162 | 8/1985 | Ace, Jr. | 446/102 X |
| 4,911,672 | 3/1990 | Erickson | 446/126 X |
| 5,048,702 | 9/1991 | Maloney | 211/194 |
| 5,191,983 | 3/1993 | Hardy | 211/40 |
| 5,399,004 | 3/1995 | Buschle | 312/9.48 X |
| 5,647,487 | 7/1997 | Reinhard | 211/194 X |

FOREIGN PATENT DOCUMENTS 793415  4/1958  United Kingdom .................. 312/9.9

Primary Examiner—Peter M. Cuomo
Assistant Examiner—Janet M. Wilkins
Attorney, Agent, or Firm—Michaelson & Wallace; Peter L. Michaelson; Michael P. Straub

[57] ABSTRACT

A CD rack includes at least two parts and each of the two parts has four connections, a first connection, a second connection, a third connection and a fourth connection. Each of the connections has a first tube extending upwardly therefrom and each of the first tubes has an inserting portion extending downwardly therefrom so that the inserting portions of one part are sized to be received in the first tubes of another part. The first connection and the second connection are located on one of two sides of the respective part and the third connection and the fourth connection are located on the other side of the respective part. Each of the first connection and the second connection has a second tube extending laterally from the respective first tube thereof and each of the third connection and the fourth connection has a third tube extending laterally from the respective first tube thereof so that the third tubes in one part are sized to be received in the second tubes of another part.

2 Claims, 5 Drawing Sheets

5,715,948

CD RACK

BACKGROUND OF THE INVENTION

1. Field of the Invention

The present invention relates to a CD rack and, more particularly, to an improved CD rack composed of at least two parts and each of the parts has four connections so as to connect the parts with each other.

2. Brief Description of the Prior Art

CD racks generally are designed to have a rectangular shape and have a lot of slots defined therein so as to receive CDs in cases. However, users gradually require a greater variety in shapes of the CD racks so that users may utilize the CD racks as a part of interior arrangement. Therefore, conventional CD racks having a rectangular shape cannot meet requirements of users today.

The present invention intends to provide an improved CD rack which is composed of at least two parts and is able to be composed to have different shapes so as to mitigate and/or obviate the above-mentioned problems.

SUMMARY OF THE INVENTION

The present invention provides a CD rack which includes at least two parts and each of the parts has four connections respectively formed on four corners thereof. The four connections comprise a first connection, a second connection, a third connection and a fourth connection. The first connection and the second connection are located on one of two sides of the respective part and the third connection and the fourth connection are located on the other side of the respective part. The first connection and the fourth connection, the second connection and the third connection are respectively located diagonally opposite on the part.

Each of the connections has a first tube extending upwardly therefrom and each of the first connection and the second connection has a second tube extending radially from the respective first tube. Each of the third connection and the fourth connection respectively has a third tube extending radially from the respective first tube wherein the third tubes are sized to be inserted into the second tubes. Each of the four connections has an inserting portion extending downwardly from the respective first tube and the inserting portions are sized to be received into the first tubes. A stop bar is connected between the first tubes between the first and the third connections.

It is an object of the present invention to provide a CD rack which is composed of at least two parts and the parts can be connected with each other from different directions.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
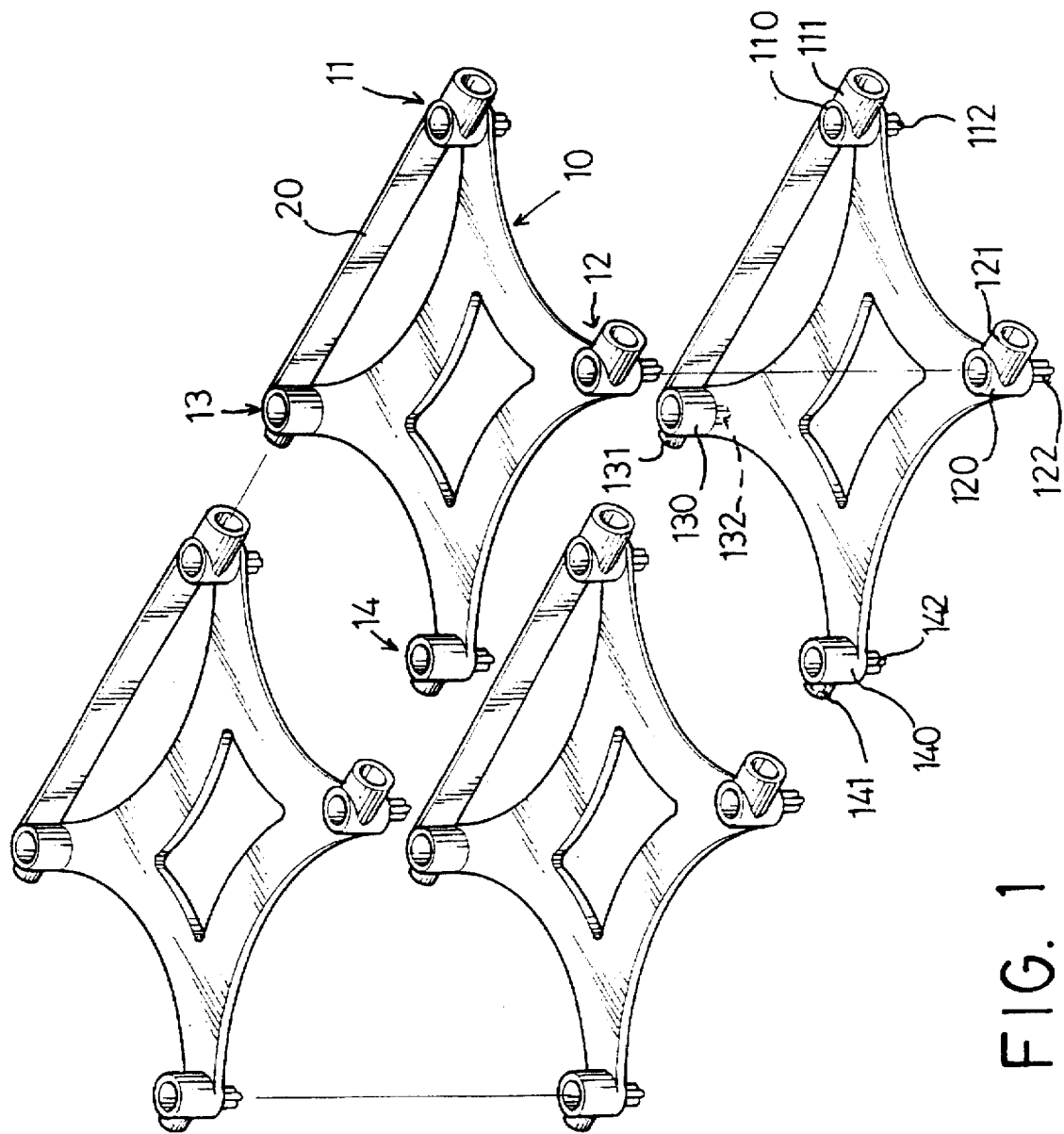
FIG. 1 is an exploded view of a CD rack in accordance with the present invention.
Figure 2:
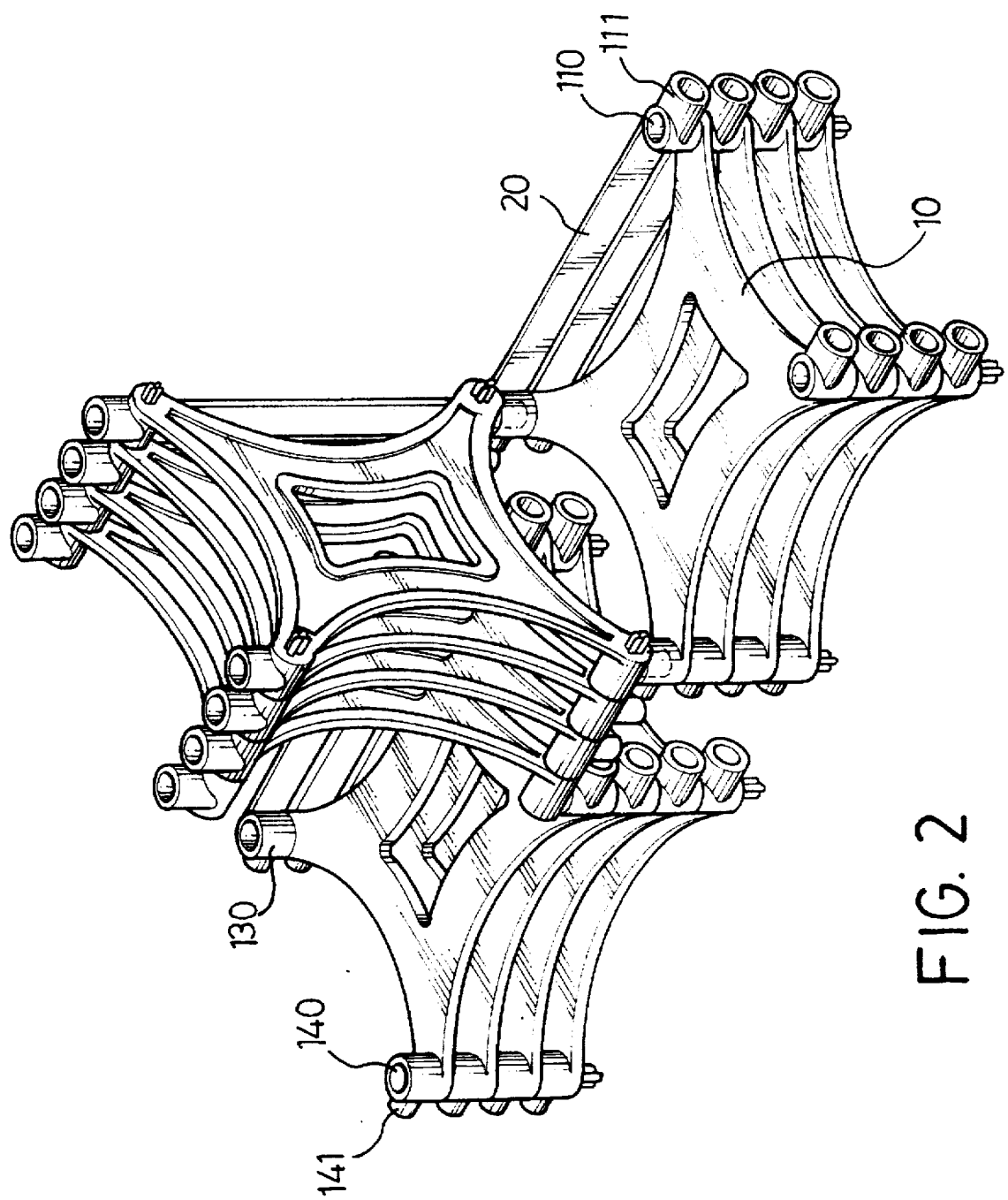
FIG. 2 is a perspective view of a type of combination of the CD rack in accordance with the present invention.

Referring to the drawings and initially to FIGS. 1 and 2, a CD rack in accordance with the present invention generally includes at least two parts 10 and each of the parts 10 has four connections respectively formed on four corners thereof. The four connections comprise a first connection 11, a second connection 12, a third connection 13 and a fourth connection 14. The first connection 11 and the second connection 12 are located on one of two sides of the respective part 10 and the third connection 13 and the fourth connection 14 are located on the other side of the respective part 10. The first connection 11 and the fourth connection 14, the second connection 12 and the third connection 13 are respectively located diagonally opposite on the respective part 10.

Each of the connections 11, 12, 13, 14 has a first tube 110/120/130/140 extending upwardly therefrom. Each of the first connection 11 and the second connection 12 has a second tube 111/121 extending radially from the respective first tube 110/120, each of the third connection 13 and the fourth connection 14 having a third tube 131/141 extending radially from the respective first tube 130/140. The third tubes 131, 141 extend toward a direction opposite to that of the second tubes 111, 121 wherein the third tubes 131, 141 are sized to be inserted into the second tubes 111, 121. Each of the four connections 11, 12, 13, 14 has an inserting portion 112, 122, 132, 142 extending downwardly from the respective first tube 110/120/130/140 and the inserting portions 112, 122, 132, 142 are sized to be inserted into the first tubes 110, 120, 130, 140. A stop bar 20 is connected between the first tubes 110, 130 between the first and the third connections 11, 13.

Four parts 10 can be assembled together to be a block by inserting the inserting portions 112, 122, 132, 142 of an upper part 10 into the first tubes 110, 120, 130, 140 of a following and lower part 10 which is disposed below the upper part 10 such that a CD case (not shown) can be horizontally received between the upper part 10 and the lower part 10 with one side of the CD case contacting the stop bar 20 of the lower part 10. FIG. 2 shows three such blocks being arranged to be a combination wherein two of the blocks are disposed separately and the third block including four parts 10 is disposed across between the two separated blocks with the two pairs of third tubes 131, 141 on the two far-most ends of the third block being received in the first tubes 110, 120, 130, 140 of the two blocks such that the third block is disposed perpendicularly to the other two blocks.

Figure 3:
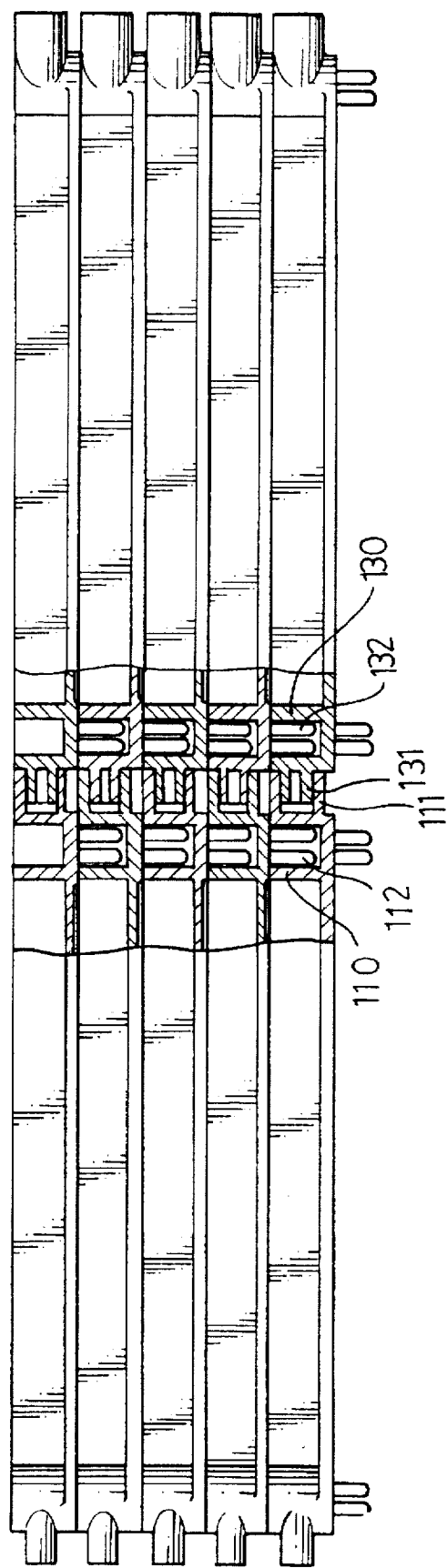
FIG. 3 is a side elevational view, partly in section, of another type of combination of the CD rack in accordance with the present invention.

FIG. 3 shows another type of combination of the CD rack wherein the two blocks as mentioned above are disposed side by side with the third tubes 131, 141 of one block being received in the second tubes 111, 121 of the other block.

Figure 4:
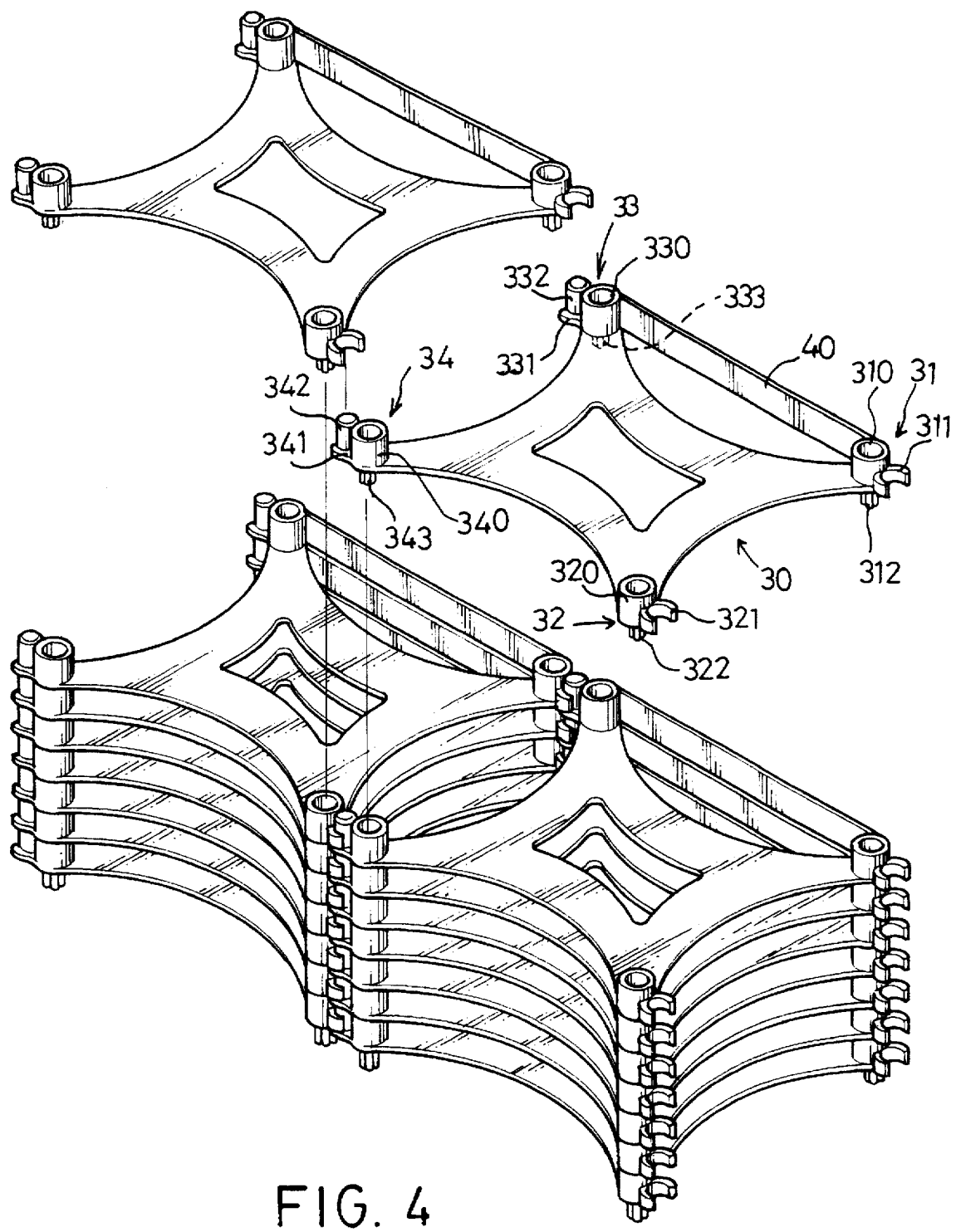
FIG. 4 is an exploded view of another embodiment of the CD rack in accordance with the present invention.

FIG. 4 shows another embodiment of the CD rack wherein each of the parts 30 has four connections formed on four corners thereof. The four connections comprise a first connection 31, a second connection 32, a third connection 33 and a fourth connection 34. The first connection 31 and the second connection 32 are located on one of two sides of the respective part 30 and the third connection 33 and the fourth connection 34 are located on the other side of the respective part 30. The first connection 31 and the fourth connection 34 are located diagonally on the respective part 30 and each of the connections 31, 32, 33, 34 has a first tube 310/320/330/340 extending upwardly therefrom. Each of the first connection 31 and the second connection 32 has a clip member 311/321 extending radially from the respective first tube 310/320 and each of the third connection 33 and the fourth connection 34 has an extending plate 331/341 extending radially from the respective first tube 330/340. Each of the extending plates 331, 341 has a rod 332/342 extending upwardly therefrom wherein the rods 332/342 are sized to be clipped by the clip members 311/321. Each of the four connections 31, 32, 33, 34 has an inserting portion 312/322/333/343 extending downwardly from the respective first tube 310/320/330/340 and the inserting portions 310, 320, 330, 340 are sized to be inserted into the first tubes 310, 320, 330, 340. A stop bar 40 is connected between the first tubes 310, 330 between the first and the third connections 31, 33. Accordingly, eight parts 30 can be assembled as a block by inserting the inserting portions 312, 322, 333, 343 of one part 30 into the first tubes 310, 320, 330, 340 of the following part 30. The two blocks are assembled by the rods 332, 342 of one block being clipped in the clip members 311, 321 of the other block.

Figure 5:
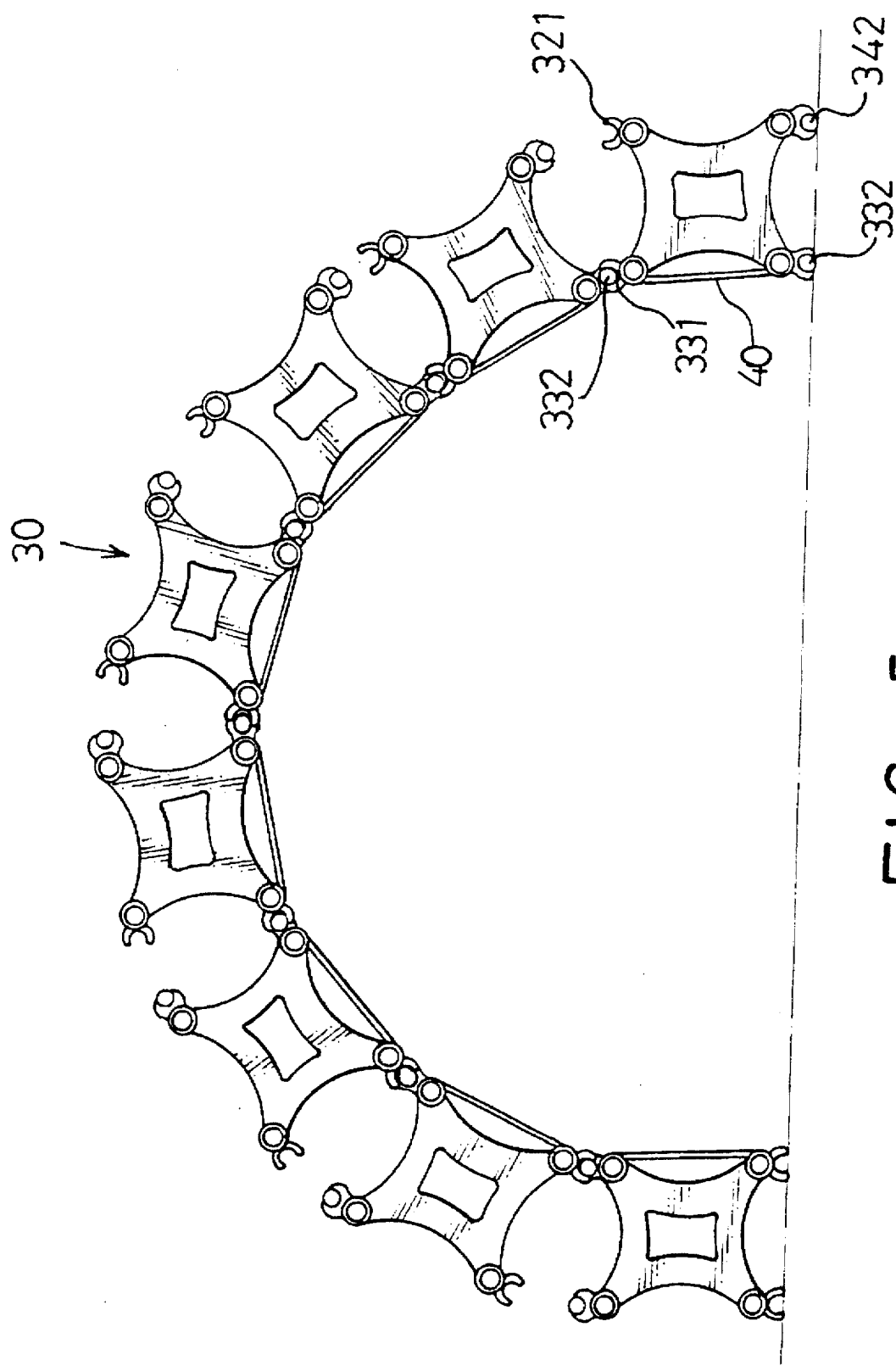
FIG. 5 is an illustrative view to show another type of combination of the CD rack shown in FIG. 4.

FIG. 5 shows another type of combination of the embodiment of the CD rack wherein the blocks can be assembled as an arcuate combination by receiving the rods 332 of one block into the clip members 311 of the adjacent block.

Accordingly, the parts 10, 30 can be conveniently assembled and the configurations of the assembled parts can be determined by users. Furthermore, the parts 10, 30 are easily to be transported by overlapping the parts which occupy a smaller space than the conventional CD rack.

Although the invention has been explained in relation to its preferred embodiment, it is to be understood that many other possible modifications and variations can be made without departing from the spirit and scope of the invention as hereinafter claimed.

What is claimed is:

1. A CD rack comprising at least two parts and each of said parts having four connections formed on four corners of said parts, said four connections comprising a first connection, a second connection, a third connection and a fourth connection, said first connection and said second connection located on one of two sides of said respective part and said third connection and said fourth connection located on the other side of said respective part, said first connection and said fourth connection located diagonally opposite on said respective part and said second connection and said third connection located diagonally opposite on said respective part, each of said connections having a first tube extending upwardly therefrom, each of said first connection and said second connection having a second tube extending radially from said respective first tube, each of said third connection and said fourth connection having a third tube extending radially from said respective first tube wherein said third tubes are sized to be inserted into said second tubes, each of said four connections having an inserting portion extending downwardly from said respective first tube and said inserting portions sized to be inserted into said first tubes, a stop bar connected between said first tubes between said first and said third connections.

2. A CD rack comprises at least two parts and each of said parts having four connections formed on four corners of said parts, said four connections comprising a first connection, a second connection, a third connection and a fourth connection, said first connection and said second connection located on one of two sides of said respective part and said third connection and said fourth connection located on the other side of said respective part, said second connection and said third connection located diagonally opposite on said part, said first connection and said fourth connection located diagonally on said respective part, each of said connections having a first tube extending upwardly therefrom, each of said first connection and said second connection having a clip member extending radially from said respective first tube, each of said third connection and said fourth connection having an extending plate extending radially from said respective first tube and each of said extending plates having a rod extending upwardly therefrom wherein said rods are sized to be clipped by said clip members, each of said four connections having an inserting portion extending downwardly from said respective first tube and said inserting portions sized to be inserted into said first tubes, a stop plate connected between said first tubes between said first and said third connections.

\* \* \* \* \*